United States Patent [19]

Wichterle et al.

[11] 4,183,884

[45] Jan. 15, 1980

[54] METHOD FOR MANUFACTURING HYDROGEL TUBES

[75] Inventors: Otto Wichterle; Artur Stoy, both of Prague, Czechoslovakia

[73] Assignee: Ceskoslovenska akademie ved, Prague, Czechoslovakia

[21] Appl. No.: 737,051

[22] Filed: Nov. 1, 1976

Related U.S. Application Data

[63] Continuation-in-part of Ser. No. 432,515, Jan. 11, 1974, abandoned.

[30] Foreign Application Priority Data

Jan. 24, 1973 [CS] Czechoslovakia ............... 533/73

[51] Int. Cl.$^2$ .................................................. B05D 3/00
[52] U.S. Cl. ........................................ 264/41; 128/260; 260/29.6 AN; 264/49; 264/173; 264/177 F; 264/182; 424/15; 428/398
[58] Field of Search ............. 264/182, 41, 173, 177 F, 264/49; 266/29.6 AN; 424/15; 128/260; 428/398

[56] References Cited

U.S. PATENT DOCUMENTS

| | | | |
|---|---|---|---|
| 3,674,628 | 7/1972 | Fabre | 264/209 |
| 3,679,355 | 1/1952 | Yamaguchi et al. | 264/182 |
| 3,728,072 | 4/1973 | Orito et al. | 264/182 |
| 3,733,386 | 5/1973 | Shimoda et al. | 264/182 |
| 3,799,356 | 3/1974 | Salyer et al. | 264/182 |
| 3,802,954 | 4/1974 | Orito et al. | 264/182 |
| 3,812,071 | 5/1974 | Stoy | 260/29.6 TA |
| 3,862,452 | 1/1975 | Wichterle et al. | 128/334 R |
| 3,864,323 | 2/1975 | Stoy | 260/88.7 R |
| 3,871,950 | 3/1975 | Hashino et al. | 264/182 |
| 3,897,382 | 7/1975 | Stoy et al. | 260/29.6 AN |
| 4,021,382 | 5/1977 | Stoy et al. | 128/334 R |
| 4,061,821 | 12/1977 | Hayano et al. | 264/182 |

*Primary Examiner*—Jay H. Woo

[57] ABSTRACT

There is disclosed a method of producing hydrogel tubes comprising partially hydrolyzing an acrylonitrile-containing polymer in an inorganic acidic solvent solution at temperature of about $-10°$ to $50°$ C., extruding said hydrolyzed polymer solution through a circular nozzle into an aqueous coagulating bath, the same or similar coagulating bath simultaneously being fed through a central tube or pin of the nozzle.

Preferably, the surface of the tube is made very slippery in wet condition, by treating it with chemical agents causing either a further hydrolysis or other reaction leading to carboxylic, sulfonic or sulfuric groups, or an esterification with polyols such as glycerol, glycols or polyvinyl alcohol, preferably with simultaneous sulfonation or sulfuration.

10 Claims, No Drawings

METHOD FOR MANUFACTURING HYDROGEL TUBES

RELATED APPLICATIONS

This application is a continuation-in-part application of copending application Ser. No. 432,515, filed Jan. 11, 1974, now abandoned entitled METHOD FOR MANUFACTURING HYDROGEL TUBES.

This invention relates to the production of elastic tubes from synthetic hydrogels, which hydrogels are formed from partly hydrolyzed polyacrylonitrile which is swellable in water and in aqueous solutions and capable of absorbing considerable amounts of medicaments, physiological materials, drugs and/or bactericidal and bacteriostatic substances therein.

Heretofore, elastic tubes used in surgery as for example, sounding tubes, catheters, cannulae and the like have been made from various hydrophobic and impervious materials which materials have physiologically disadvantageous properties; exemplary of the same is a product made from rubber or polyvinyl chloride which has been plasticized. They possess sufficient strength and flexibility, on the one hand, however when introduced into the body over a long period of application they cause painful and slow healing injuries, hemorrhages and irritation; all of which are hardly bearable by patients, particularly infants. Inflammations often occur, causing reduction of the diameter of the tubular organ after healing, to such a degree that further surgery is often necessary afterwards. It has been suggested to remove said shortcomings by coating rubber tubes such as catheters with a thin layer of a sparingly cross-linked hydrogel produced from glycol methacrylate. Thereby, the introduction thereof into the body is reputably made easier and it is supposedly possible to impregnate the hydrogel layer with drugs but only in small amounts due to the physical dimensions of the layer (i.e. thickness). Further shortcomings of such gel coatings are comparatively low strength and poor adhesion to the tube body, making for necessary intermediate layers. These and other shortcomings are reduced by the present invention and furthermore, the amount of absorbed drugs is increased and a difficulty encountered at the introduction of the tubes, caused by excessive friction in contact with mucous membranes are also reduced.

It is accordingly an object of the instant invention to avoid one or more drawbacks of the prior art.

It is another object of the invention to provide for a method of producing elastic hydrogels suitable for physiological applications.

These and other objects of the invention will become apparent from the detailed description and claims which follow hereinafter.

Broadly speaking, the instant invention includes the provision of a method of producing hydrogel tubes comprising partially hydrolyzing an acrylonitrile-containing polymer in an inorganic acidic solvent solution at temperatures of about $-10°$ to $50°$ C., preferably from $0°$ to $25°$ C., extruding said hydrolyzed polymer through a circular nozzle into an aqueous coagulating bath, the same or similar coagulating bath simultaneously being fed into the lumen of the formed tube through a central tube or pin of the nozzle.

As is readily apparent from the above, the means and method employed to polymerize the acrylonitrile form no essential part of the instant invention and accordingly may be carried out by procedures known in the art. Further description with reference thereto is accordingly not necessary to enable the skilled artisan to carry out the instant invention.

Polyacrylonitrile is therefore placed or formed in solution of a mineral acid such as, nitric acid, preferably concentrated (i.e. about 50% to about 72%); sulfuric acid, preferably dilute, (i.e. about 65 to about 75%); or in aqueous salt solutions capable of dissolving polyacrylonitrile, preferably as concentrated solutions, the salts of this series include zinc chloride, sodium rhodanide, calcium rhodanide, lithium bromide, if desired mixed with a minor amount of other highly soluble salts not dissolving, but also not coagulating the polymer, such as calcium, magnesium or sodium chloride; particularly preferred is zinc chloride. A controlled partial acidic hydrolysis of the polyacrylonitrile is thereafter carried out in a solution of one of said aforementioned materials (i.e., -acid or salt solution). The hydrolysis is carried out at temperatures of about $-10°$ C. to $50°$ C., preferably at temperatures below about $25°$ C., but above about $0°$ C.

The thus hydrolyzed viscous polyacrylonitrile solution is then extruded. As is apparent, the hydrolysis is carried out until the polyacrylonitrile solution coagulates in aqueous liquids to a rubbery hydrogel, absorbing from about 30 to about 75% water (by weight) at swelling equilibrium. The time needed therefore is determined by many variables, such as, temperature, pH value, solution employed, concentration of the latter and the like. The extrusion may be carried out through a circular nozzle into a coagulating bath. The extrusion furthermore may be carried out either directly or after coagulating the copolymer and re-dissolving it in organic solvent such as wet dimethyl sulfoxide, wet dimethyl formamide or wet cyclic ethylene carbonate, and then passing it through a circular nozzle into the coagulating bath, the same or similar coagulating bath simultaneously being fed through a central tube or pin of the nozzle.

As is apparent, the specific means employed in extruding the viscous polyacrylonitrile solution are substantially non-critical, with the provision that the above parameters are followed. It is to be understood, of course, that those skilled in the art may wish to devise their own extrusion procedures which would still be operative in carrying out the instant invention. In any case, the product of the extrusion will be the result of the instant procedure.

A further embodiment of the invention contemplates the provision of producing painless non-traumatic surgical applications of the thus produced hydrogel tubes, such as, for sounds, cannulae and the like, the coagulated tube may be treated with agents operative to increase the hydrophility of the surface thereof and decrease the slip resistance thereof. Such agents include, e.g., compounds causing further hydrolysis, advantageously in connection with cross-linking or other reactions. Included are agents, such as, nitrous acid, strong bases such as alkali metal hydroxide solutions, chlorosulfonic acid, fuming sulfuric acid, sulfur trioxide and similar. Treatment with a hot mixture of concentrated sulfuric acid with a lower alky polyhydric alcohol, i.e. either glycerol or ethylene-, diethylene-, or triethylene glycols or polyvinyl alcohol is preferred. Hydrogels containing from 30 to 75% by weight of water may be easily treated with said reagent, notwithstanding the initial thought that water will supress, by its diluting effect, the hydrolytic and esterifying power of sulfuric acid, thereby making thus the building of glycerol or glycol esters impossible. Moreover, sulfuric acid alone dissolves the same hydrogel, even if diluted to 70-90% with water. Glycerol alone removes water from the hydrogel rapidly so that the latter hardens, particularly at increased temperatures. It heretofore was not known apparently that said conflicting forces would mutually compensate for each other so that a thin, smooth and slippery layer would be formed on the water-swollen hydrogel by a treatment lasting only several minutes, such that said layer being inseparably connected with the tube and increasing, moreover, by cross-linking the stability of the hydrogel against deterioration. The thin layer not only does not hinder the diffusion of drugs from the hydrogel itself, on the contrary, it increases the diffusion rate and simultaneously enhances the sorption capacity for drugs having comparatively large molecules which would penetrate only with some difficulty or not at all into the untreated hydrogel. Moreover, said surface treatment raises the concentration of negatively charged groups, whereby the possibility of blood coagulation is lowered. This is of importance particularly in the application for blood-vessel cannulae.

The above treatment with sulfuric acid contemplates using the same at a concentration of about 70 to 120%, preferably about 90 to 97%, at a temperature of about 0° to 130° C., preferably about 20° to 100° C. The ratio of one of said polyhydric alcohol to said acid is about 2-8:1, preferably about 4:1. The time period for the treatment in the acid alcohol mixture to take place can vary from about 1 sec to about 60 minutes, advantageously about 20 sec to about 30 minutes.

It is also possible to perform the said process in two separate steps, first treating the hydrogel tube with a polyol and then, after the surface layer has been swollen therewith, to immerse the tube into sulfuric acid at a suitable temperature which may be either higher or lower than that of the polyol. Besides the above mentioned surface treatment with sulfuric acid and glycerol or glycol, it is possible to enhance the slipperiness of the tube surface also by short periods of immersion into hot sufficiently concentrated alkaline lye. Periods of time may vary from about 1 second to 15 minutes, preferably about 1 to 5 minutes. The lye may have a concentration of about 10 to 60%, preferably 25 to 50%. The foregoing may also be carried out by means of sulfonating agents such as vapors of chlorosulfonic acid or sulfur trioxide at a concentration of about 0.1 to 20, preferably 0.5 to 5%, brought in contact with the tube surface which has been advantageously dried.

The slip resistance is defined as the minimal force necessary to produce slipping of two planar sheets of the examined material pressed together by a unit of force (e.g. 100 g) over a unit of their surfaces (e.g. one square inch).

The reduction of the slip resistance produced by the surface treatment disclosed as expressed by the ratio of slip resistance of the untreated and treated material is higher than 10:1.

The treatment is carried out in such a way that the reagent affects either the outer surface only, or the outer and inner surfaces simultaneously. The temperature, concentration and time of the treatment can be readily determined. After neutralizing the treated surface e.g. with a diluted sodium bicarbonate solution, the slippery, super-hydrophilized surface layer should be rather thin so that nothing is markedly separated if the tube is boiled in physiologic saline for about 10 minutes.

Drugs and other biologically active substances may be incorporated therein in different ways. Acid-sensitive substances may be absorbed into a ready made thoroughly washed tube, immersed in a drug solution. Large amounts of drugs may be stored, if insoluble or only slightly soluble in water and in the coagulating bath as well as in the polymer solution, by adding them to the polymer solution prior to the coagulation. Another possibility is to dissolve the drug in a dimethylsulfoxide or dimethylformamide solution of the copolymer and to coagulate it simultaneously with the latter, e.g. in a glycerol coagulating bath. After a certain time an equilibrium occurs so that the bath contains the equilibrium concentration of the physiologically active substance and the content thereof in the tube remains constant. It is also possible to provide grains of the active substance with a coating layer preserving them against the polymer solvent and being dissolved until the washing bath, or in a separate bath, either slightly acid or basic, as the case may be, which is finally washed in water.

The invention will be further described by reference to the following examples which are given by way of illustration only. All parts, proportions and ratios therein as well as in the appended claims are by weight unless otherwise indicated.

EXAMPLE 1

160 p. of distilled acrylonitrile are dissolved in 835 p. of 65% colorless nitric acid, and 3 p. of a 5% aqueous solution of potassium peroxodisulfate; 1.1 p. of urea, dissolved in 2 p. of water are also stirred in. The stirring is continued under carbon dioxide until the colloidal precipitate of urea nitrate is dissolved. Then the solution is left to stand at 22° to 23° C., access to oxygen and actinic light being avoided. After 170 hours standing, the viscous solution is extruded through a 5 mm broad nozzle provided with a central tube of 1 mm calibre and 2 mm outer diameter at its conical end, through which water is slowly led from a 12 cm level. The rate of extrusion is from 60 to 120 cm per minute; as coagulation bath, plain water from the water-tap is used, which is steadily and slowly withdrawn and simultaneously replaced by fresh water so that the nitric acid concentration does not exceed 5%. The coagulated tube is washed first in a 1% sodium bicarbonate solution and then in water until neutrality is reached. Then water is removed from the surface and the tube is immersed for 2 minutes into an 80° C. hot bath, consisting of 4 p. of concentrated sulfuric acid and 1 p. of glycerol. The tube is then rinsed in water, immersed for several minutes into a 1% aqueous sodium bicarbonate solution and, finally, into physiological saline containing 0.8% of sodium chloride, 0.1% of dihydrocortisone and 0.1% of tetracycline-hydrochloride. Before said immersion or afterwards the tube is sterilized by boiling. It can later be used as a feeding or breathing sound for infant patients.

EXAMPLE 2

The process described in Example 1 is repeated except that the washed tube is stretched in 98° C. water, containing 0.01% of rivanol, prior to the immersion into the physiological saline containing drugs. The stretched tube is cooled down and then immersed into said sterile physiological solution. The finished tube has about four times greater length in comparison with the non-stretched one, and a reduced wall thickness and inner diameter accordingly. It is useful particularly as blood vessel cannula.

EXAMPLE 3

The remainder of the polymer solution from Examples 1 and 2 is extruded in a thin stream into cold water and the copolymer is washed and then dissolved in a mixture of 7 p. of dimethyl sulfoxide and 3 p. of water. The viscous (about 10%) solution is then extruded through the same nozzle as in Example 1 into an aqueous coagulating bath which is countercurrently withdrawn, and supplemented by fresh water. Dimethyl sulfoxide is recovered from the waste about 15% solution by distillation. The resulting tube is similar to that according to Example 1 and can be used for the same purpose.

EXAMPLE 4

143 g of acrylonitrile, 2 g of methacrylonitrile and 1 g of urea (the latter dissolved in 2 ml of water) are dissolved in 850 ml of 70% nitric acid containing no free nitrogen oxides. Finally, 1.5 ml of a 10% aqueous ammonium peroxodisulfate solution is stirred in. After having been stirred thoroughly, the solution is covered by a 1.5 cm thick layer of white paraffin oil and left to polymerize 200 hours at 15° C., access of actinic light being excluded. The oil is then poured off the surface of the viscous solution and the surface rinsed three times with a small amount of hexane. The solution is then extruded through a circular nozzle having an outer diameter of 4 mm, with an inner hollow pin through which water is metered during the extrusion. The coagulated and washed tube (1 mm inner diameter and 1.5 mm wall thickness) is then freed of water adhering to the surface and exposed for 3 minutes to vapors of chlorosulfonic acid. After neutralization and washing the tube is stretched in boiling physiologic saline containing 0.01% of rivanol and left to cool down in a stretched condition. The capillary tube thus obtained is then wound onto a bobbin and the ends thereof duly fastened. The bobbin is then stored in sterile physiological saline wherein it can be sterilized in a stretched condition again by boiling if needed.

EXAMPLE 5

A mixture of 3 volume parts of a 70% aqueous zinc chloride solution and 2 volume parts of saturated aqueous calcium chloride solution is used as solvent. In this solvent 14% of anhydrous acrylonitrile are dissolved and the solution initiated by 0.15% of peroxodisulphate of ammonium and the same amount of potassium pyrosulphite, added as 10% aqueous solutions. Then the mixture is activated with 0.006 g of copper chloride (dihydrate) in the form of an 0.1% aqueous solution. The mixture is stirred under inert gas and cooled externally by a mixture of salt and ice to avoid raising the temperature over 30° C. After 45 minutes, the stirring of the viscous solution is stopped, the solution is degassified in a 28 Torr vacuum and extruded, after having been heated to 70° C., through a circular nozzle into cold cyclohexane saturated with dry hydrogen chloride; cold 60% sulfuric acid being led into the extruded tube by a central pin. The tube is left in hydrogen chloride saturated cyclohexane for 12 hours at temperature not exceeding 10° C. Then it is thoroughly washed in water, the surface wiped dry and exposed for 15 seconds to sulfur trioxide vapors over a 15% fuming sulfuric acid. After having been rinsed, neutralized and washed the tube is stored in sterile physiological saline. It has a rather tough, but still hydrophilic core and a very soft, strongly swelled outer hydrophilic layer.

EXAMPLE 6

The polyacrylonitrile solution in aqueous salt solution according to Example 5 is extruded in a thin layer (through holes with a maximum diameter of 0.5 mm) into a high glass vessel filled with dry hydrogen chloride. The polymer solution on the bottom is left in contact with hydrogen chloride at 22° C. for 24 hours under intermittent stirring. Then the solution is once more thoroughly stirred and degassified in a vacuum of a water jet pump. The degassified solution is extruded into a 10% solution of salts used as solvents, the coagulating bath being countercurrently supplemented from the following washing bath. Simultaneously, a part of the coagulating bath is withdrawn for the recovery of salts by evaporation under reduced pressure. The nozzle used for the extrusion has a circular 5 mm opening and a central pin through which the coagulating bath liquid is led at such a rate that the calibre of the formed tube is from 2 to 2.4 mm. After thorough washing, the tube is treated on its outer surface by a 95° C. hot mixture of 2 p. of diethylene glycol and 7 p. of concentrated sulfuric acid, for 80 seconds. Then the tube is rinsed in water, neutralized with aqueous sodium bicarbonate solution and washed in distilled water. The tube is then stored in physiological saline containing suitable physiologically active substances such as local anesthetics, antibiotics and hormonal preparations.

EXAMPLE 7

Pulverous polyacrylonitrile, prepared by the usual precipitation-polymerization in water by means of a redox initiator, is dispersed while stirring at −20° C. cold 76% sulfuric acid and the dispersion is gradually transformed to a very viscous 12% solution by stirring and increasing the temperature up to +4° C. The solution is then kept for 24 hours at the same temperature of 4° C. Then it is extruded through a circular nozzle into water which is simultaneously led through the central pin. After a washing which need not be complete in this step, the tube is fed continuously through a bath consisting of 4 p. of concentrated sulfuric acid and 1 p. of glycerol at such a rate that the treatment lasts from 90 to 100 seconds. The temperature of the bath is 100° C. There followed then rinsing in water, neutralization by a sodium bicarbonate solution and washing in water. Further treatment is as in the foregoing Examples.

As is apparent from the foregoing examples, the material employed need not be 100% acrylonitrile, copolymers thereof with monomers such as acrylamide, methacrylamide, acrylic acid, methacrylic acid, vinyl pyridine, vinyl pyrrolidone, methyl methacrylate, methacrylonitrile, vinyl carbazole and the like may also be employed to produce an acrylonitrile containing polymer. The relative ratios being about 85:15, preferably about 99 to 1.

The process of the present invention produces a novel product which is characterized by being a multi-block copolymer of acrylonitrile with acrylamide, which under X-ray diffraction analysis reveals a pattern of crystalline or quasi-crystalline polyacrylontrile with an interplanar periodicity of 5.1 A on a background of an amorphous phase formed by acrylamide and/or acrylic acid polymer chain segments.

The term partial acidic hydrolysis in inorganic solvents is meant to include hydrolyzing until such time that a rubbery hydrogel is obtained, capable of absorbing from about 10 to about 95 weight percent of water at swelling equilibrium. However, the preferred range for surgical applications is 30 to 75 weight percent water. The required time is inversely proportional to the acidity and temperature. Very strong, elastic hydrogels are obtained, if the hydrolysis was carried out at comparatively low temperatures, such as from about 5 to about 10° C.

The sterilization may be more conveniently performed by treating the tubes with ethylene oxide or with other strong disinfectants, yielding no physiologically noxious products, or by irradiating with X-rays or gamma-rays. The tubes may be stored either in physiologic saline, e.g. in a welded polyethylene bag, or in "dry" condition, if swelled by glycerol, diacetine or similar. In the latter case, the tubes are to be washed or at least wetted in physiologic saline before use.

What is claimed is:

1. The method of forming an elastic hydrophilic tube from a rubbery-hydrogel, consisting of the steps of:
   (a) contacting an acrylonitrile containing polymer with a solvent solution of an acid or a salt, wherein said solvent is selected from the group consisting of mineral acids and salts capable of dissolving polyacrylonitrile, and subjecting said polymer to controlled partial acid hydrolysis in said solvent, terminating said acid hydrolysis and coagulating the solution of said polymer in a pre-extrusion coagulating bath, and redissolving the coagulated polymer in an organic solvent,
   (b) extruding the acid hydrolyzed polymer solution in the form of a tube, while feeding a coagulating bath into the interior of the formed tube, into an aqueous coagulation bath, said polymer solution being viscous in form,
   (c) treating and super-hydrophilizing the surface of the formed tube, while in a swollen state, with a hydrolyzing agent, wherein said polymer is a multi-block copolymer of acrylonitrile with acrylamide, which under X-ray diffraction analysis reveals a pattern of crystalline or quasi-crystalline polyacrylonitrile with an interplanar periodicity of 5.1 A on a background of an amorphous phase formed by acrylamide and/or acrylic acid polymer chain segments.

2. The method of claim 1, wherein said solvent solution is at a temperature in the range from about 10° to 50° C.

3. The method of claim 2, wherein said solvent solution is at a temperature in the range from about 0° to below about 25° C.

4. The method of claim 1, wherein said solvent is selected from the group consisting of nitric acid, sulfuric acid and zinc chloride.

5. The method of claim 1, wherein said polymer is a 85 to 99% polymer of acrylonitrile and a monomer selected from the group consisting of methacrylamide, acrylamide, acrylic acid, methacrylic acid, vinyl pyridine, vinyl pyrrolidone, methyl methacrylate, methacrylonitrile, and vinyl carbazole.

6. The method of claim 1, wherein said organic solvent is selected from the group consisting of wet dimethyl sulfoxide, wet dimethyl formamide and wet cyclic ethylene carbonate.

7. The method of claim 1, wherein said hydrolyzing agent in step (c) is selected from the group consisting of nitrous acid, alkali metal hydroxide, chlorosulfonic acid, fuming sulfuric acid and suflur trioxide.

8. The method of claim 7, wherein said hydrolyzing agent includes sulfuric acid and a lower alkyl polyhydric alcohol.

9. The method of claim 1, wherein a pharmaceutical agent is incorporated into the hydrophilic tube.

10. The method of claim 9, wherein said pharmaceutical agent is added to a solution of the polymer during, or prior to coagulation.

* * * * *